Figure 1:
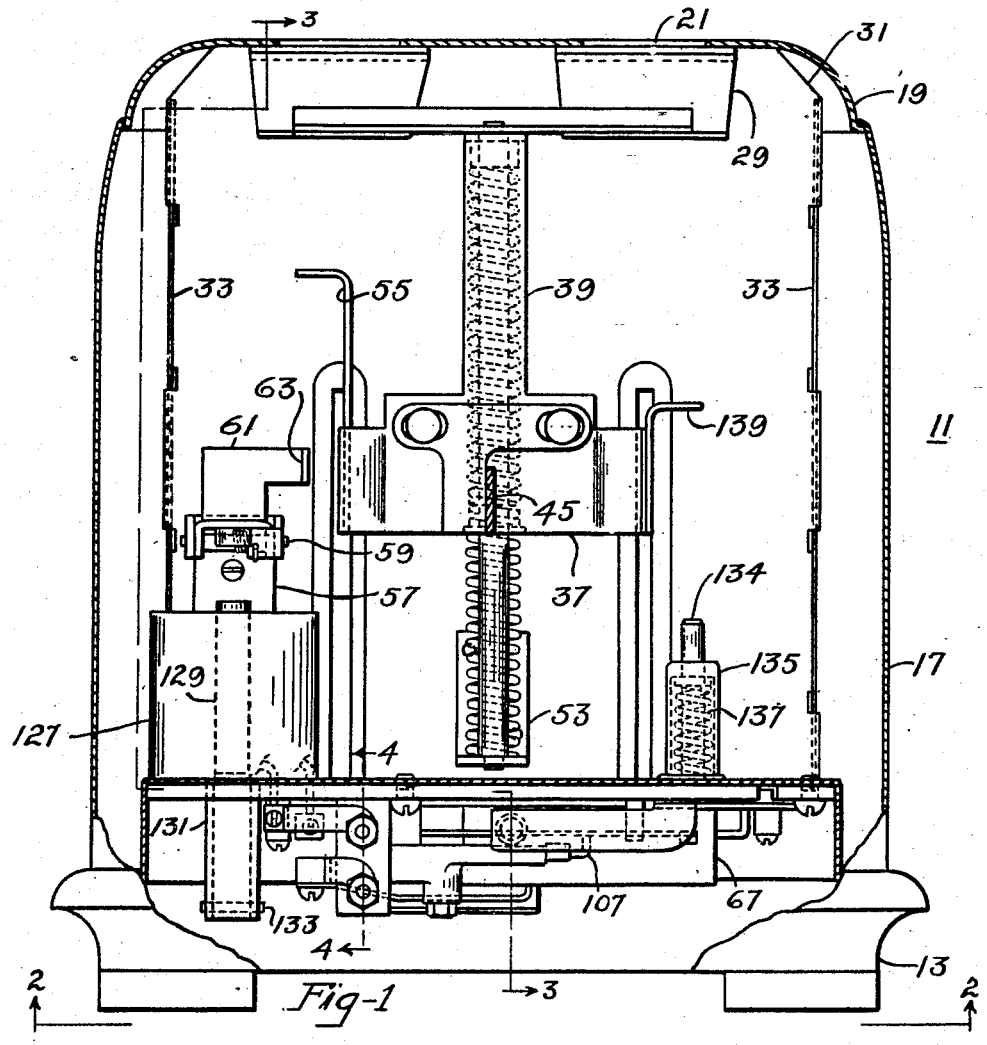

March 25, 1941.　　　J. R. GOMERSALL　　　2,236,402

THERMAL TIMER FOR AUTOMATIC TOASTERS

Filed June 16, 1939　　　2 Sheets-Sheet 1

INVENTOR.
John R. Gomersall
BY
N. M. Biebel
ATTORNEY

March 25, 1941. J. R. GOMERSALL 2,236,402
THERMAL TIMER FOR AUTOMATIC TOASTERS
Filed June 16, 1939 2 Sheets-Sheet 2
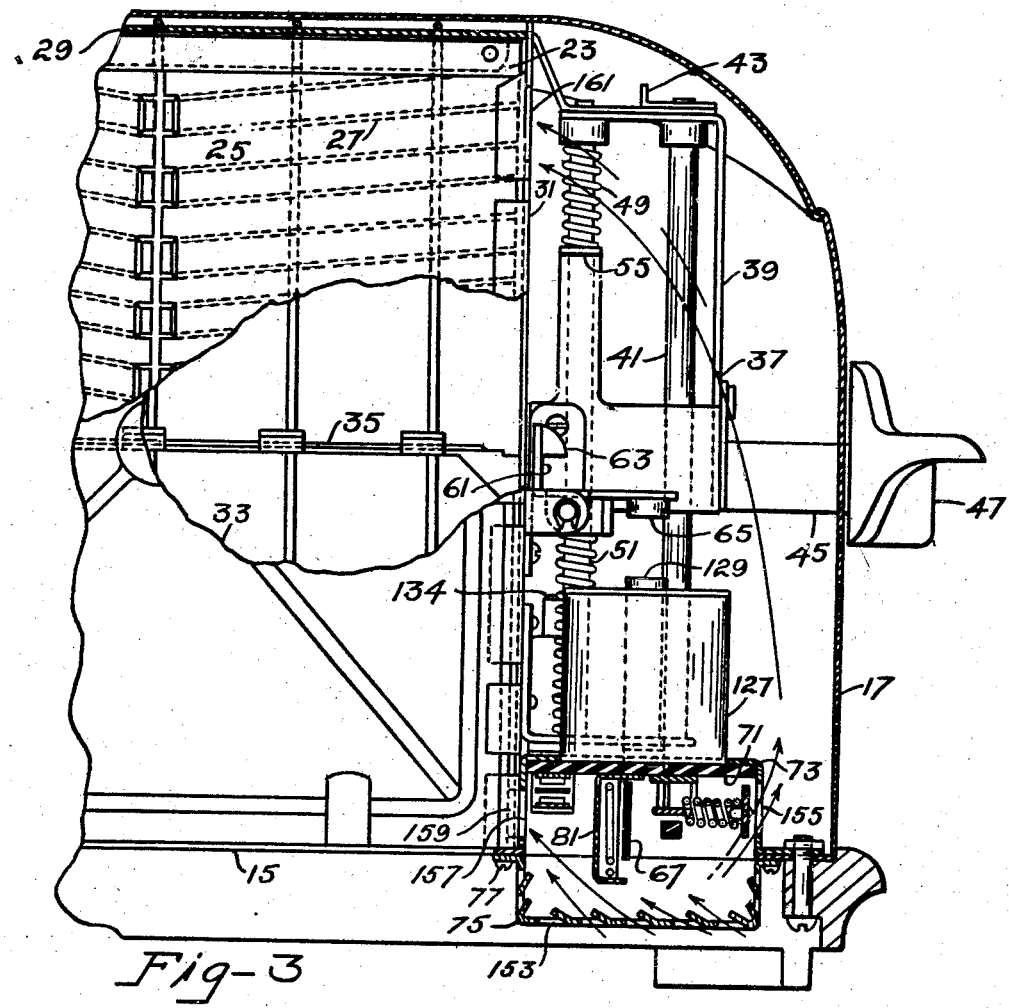
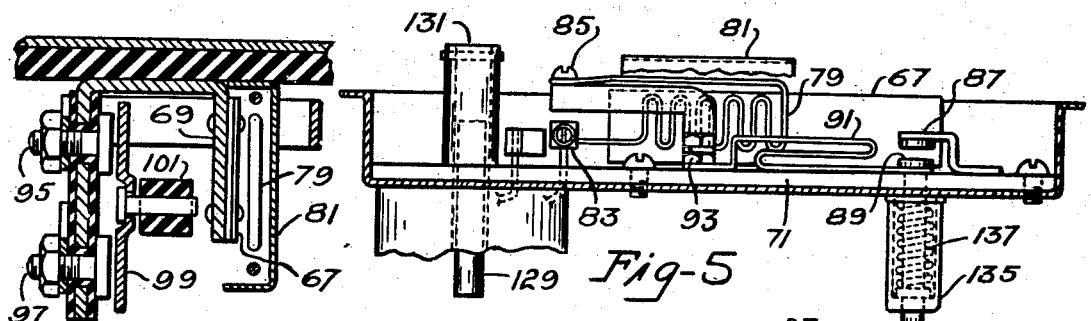
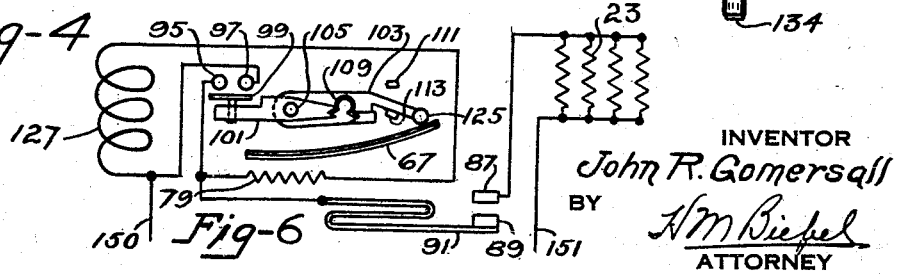
INVENTOR
John R. Gomersall
BY
ATTORNEY Patented Mar. 25, 1941

2,236,402

UNITED STATES PATENT OFFICE 2,236,402

THERMAL TIMER FOR AUTOMATIC TOASTERS

John R. Gomersall, Elgin, Ill., assignor to McGraw Electric Company, Elgin, Ill., a corporation of Delaware Application June 16, 1939, Serial No. 279,386

11 Claims. (Cl. 161—16)

My invention relates to automatic electric toasters and particularly to thermal timing means for electric toasters.

An object of my invention is to provide a relatively simple unitary thermally-actuable timing device that may easily and quickly be mounted in and removed from an electric toaster.

Another object of my invention is to provide a thermal timing means comprising a single bi-metal member and an auxiliary electric heating element therefor, operating on the heat-up, cool-off principle, both of which are so designed, constructed and located in a toaster as to control the duration of a toasting operation thereof to produce substantially uniformly toasted slices of bread irrespective of variations of toasting temperature or of the energizing voltage.

Another object of my invention is to provide a detent for holding a bread carrier in toasting position that shall be releasable by momentary impact therewith of the armature arm of an electromagnet controlled by a thermal timing means.

Still another object of my invention is to provide thermal timing means for a toaster comprising a single bimetal element operating on the heat-up, cool-off principle that shall be so designed, constructed and located in a toaster as to make unnecessary any auxiliary element or elements to compensate for the heating up of a toaster when used in successive toasting operations.

Other objects of my invention will either be set forth hereinafter, particularly in the claims, or will be evident from a description of a preferred form of device embodying my invention.

Figure 2:
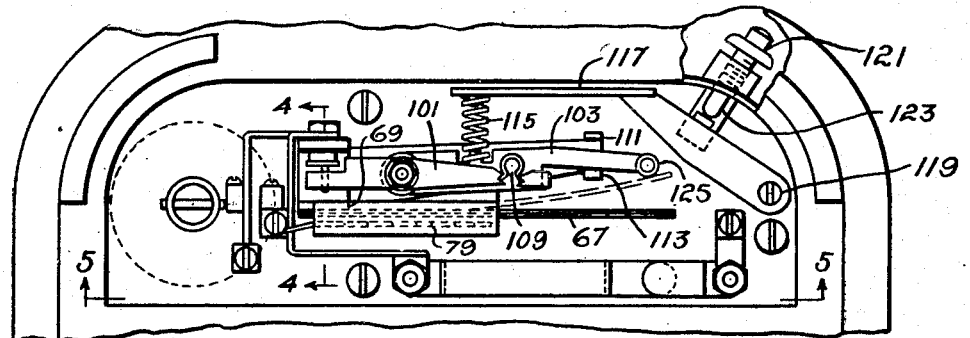
Figures 7, 8:
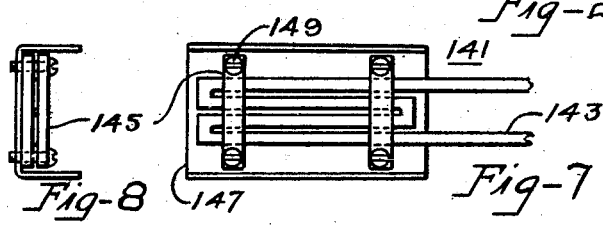

In the drawings,

Figure 1 is a view in front elevation with a front wall of the casing broken away, of an electric toaster embodying my invention, Fig. 2 is a fragmentary view in horizontal section taken on the line 2—2 of Fig. 1, Fig. 3 is a fragmentary view in horizontal longitudinal section taken on the line 3—3 of Fig. 1, Fig. 4 is a fragmentary view in vertical section and on an enlarged scale, taken on the line 4—4 of Fig. 2, Fig. 5 is a fragmentary view in vertical lateral section taken on the line 5—5 of Fig. 2, Fig. 6 is a diagram of connections which I may use in my improved toaster, Fig. 7 is a view in front elevation of a modified form of auxiliary heater, and, Fig. 8 is a view in end elevation thereof.

An automatic electric toaster, designated in its entirety by the numeral 11, includes a skeleton frame 13, which may be of moulded composition material and which has mounted thereon and properly secured thereagainst, a bottom plate 15, preferably of thin sheet metal. The toaster includes also a casing 17 comprising front, side and rear walls and a top or cover member 19. These parts are merely shown and enumerated in order to set forth all of the parts of a fully operative toaster but constitute no part of my invention since they have been in use in devices of this kind for some time.

I have elected to show a two-slice toaster structure and the cover will therefore be provided with a pair of slots 21 registering with two toasting spaces between pairs of electric toast-heating elements indicated generally by the numeral 23. These electric heating elements have been shown and described in Ireland Patent No. 2,001,362 and need therefore not be described in detail, except to set forth that they include one or more vertically extending thin plates of insulation 25, such as mica, on which is wound a resistor strip or wire 27. A pair of spaced heating elements 23 of the kind just above described, are provided for each slice of bread which is to be toasted in the toaster, so that a two-slice toaster will have four such electric heating elements spaced apart in pairs.

The lower ends of these respective heating elements 23 may be secured in any suitable or desired manner in the plate 15 while the top ends thereof may be held as by longitudinally-extending top frames 29, all now well known in the art. A front intermediate wall 31 is provided, as is shown more particularly in Figs. 1 and 3 of the drawings, and a similar rear intermediate wall is provided (but not shown) to cooperate with the outermost heating elements to provide a toasting chamber. I may, if so desired, provide baffle plates 33 outside of the outermost heating elements and located between these heating elements and a side wall of the casing. Bread carriers 35 are provided in accordance with the number of slices of bread to be toasted simultaneously, these carriers being connected in any suitable or desired manner to a front cross bar 37, which is in turn mechanically connected to a slider 39. This slider is adapted to move up and down on a vertical standard 41, the upper end of which is connected to or supported by a cross bar 43 which may be supported by the front ends of the top frames 29. A forwardly-projecting bar 45 is loosely mounted on cross bar 37 and extends forwardly far enough to have its outer end positioned outside of the front wall of the casing, an actuating knob 47 being mounted thereon. Downward pressure on the knob 47 thus causes downward movement of the bread carriers, which bread carriers are shown in their upper position in Figs. 1 and 3 of the drawings.

Means for yieldingly biasing the bread carriers to their uppermost or non-toasting position may include one or more springs 49 positioned on and about a second vertical standard 51. The upper ends of standards 41 and 51 may be supported substantially as shown in Fig. 3 of the drawings by or from the front ends of the top frames 29 while the lower ends of these standards may be supported in and by a bracket 53 shown more particularly in Fig. 1 of the drawings.

Means for temporarily holding the bread carriers in their lowermost or toasting position may comprise an extension 55 of substantially L-shape (see Fig. 1 of the drawings) which is either a part of or secured to the left-hand bread carrier 35. A detent to cooperate with the extension 55 may comprise a bracket 57 which may be secured against the front intermediate wall 31 and which has pivotally mounted thereon, on a pivot pin 59, a detent 61 of substantially L-shape and having a lug 63 at one end thereof adapted to catch over the outermost end of extension 55 when the same is moved downwardly, as has been described. The detent 61 is biased in a clockwise direction, as seen in Fig. 3 of the drawings, into latching position. The horizontally-extending portion of the detent 61 may be provided with a striker block 65 shown more particularly in Figs. 1 and 3 of the drawings.

The parts more particularly comprising my invention will now be described. They include a thermal timing means operating on the heat-up, cool-off principle and including a relatively wide bimetal strip 67, one end of which is secured to a fixed bracket 69 which in turn is secured against a plate 71 of electric-insulating material.

The timing device includes also a casing having an upper portion 73 and a lower portion 75 which may be secured together in any suitable or desired manner such as by means of short machine screws 77. The casing made up by the two casing portions 73 and 75 is generally closed except as will be hereinafter set forth more in detail.

The timing device includes also an auxiliary heater 79 which may be made of bare resistor wire of relatively small thermal mass. This auxiliary heater 79 is located closely adjacent to and at one side of the bimetal bar 67 and in order to obtain the desired effect of heat generated in the auxiliary resistor on the bimetal bar 67, I may provide a reflector and screen 81 which I also prefer to make of relatively small thermal mass in order to reduce to as great an extent as possible the absorption of heat generated in the auxiliary heater when the same is energized. This auxiliary heater 79 may be supported in any suitable or desired manner and I have found it possible to support the same from the end portions thereof on contact members 83 and 85 as is shown for instance in Fig. 5 of the drawings.

A main switch to control the energization of the main and of the auxiliary electric heaters in the toaster may comprise a fixed contact member 87 supported from plate 71 and a movable contact member 89, which contact member 89 is carried by a return bent spring member 91 which is so shaped as to normally yieldingly bias contact 89 out of engagement with contact 87. The spring bar 91 may be secured against the plate 71 as by a bolt 93.

The timing devices include also a short-circuiting switch for the auxiliary heater 79. This switch includes a pair of fixed contact members 95 and 97 which are insulatedly supported on the bracket 69 hereinbefore described as supporting the bimetal member 67. A contact bridging member 99 is pivotally mounted on an arm 101, preferably made of electric insulating material. An actuating arm 103 therefor is also pivotally mounted on the same pin 105 as is arm 101. Arm 103 has a depending projection 107 thereon having a V-slot in its end into which V-slot one end of a spring 109, of substantially C-shape, is adapted to fit, the other end of the spring 109 fitting into a similar recess in the end of arm 101. Turning movement in either direction of arm 103, which may be limited by a pair of stop members 111 and 113, causes a sudden movement of arm 101, the spring 109 operating as does the usual over-center spring in devices of this general kind.

Means for biasing arm 103 in a given direction may comprise a coil spring 115, one end of which may interfit with an intermediate portion of arm 103 while the other end thereof may interfit with one end of a lever arm 117 which is pivotally mounted on plate 71 as at 119 (see Fig. 2). An adjusting knob 121 may be suitably supported, as for instance in the frame 13, on a shaft 123, so that turning movement of the knob 121 and shaft 123 will result in small angular movements of lever arm 117. Referring particularly to Fig. 2 of the drawings, any compression exerted on coil spring 115 will tend to bias arm 103 in a clockwise direction and against stop 113. The outer end of arm 103 may be provided with a roller 125 in order to reduce the friction between the free end of bimetal bar 67 and the arm 103 when the bimetal bar engages the roller 125 on being heated by the auxiliary heating element 79.

Means for effecting turning movement of detent 61 to release the projection 55 therefrom may comprise a solenoid 127 having a core 129 therein, which core is adapted to be moved quickly upwardly upon energization of the solenoid 127 in a manner to be hereinafter described. In order that the core 129 shall be energizable by the solenoid, I provide a depending tubular member 131 having a cotter pin 133 at its bottom end so that the unenergized core 129 will normally have the greater part of its length positioned within the tube 131.

Means for causing contact members 89 and 87 to engage, comprises a rod 134 which may be made of electric insulating material, housed in a tubular member 135 which is secured to the plate 15, the rod 134 being normally biased upwardly by a spring 137. The cross piece 37 is provided with a second projection 139 so positioned thereon that when the cross piece and the carriers are moved downwardly, projection 139 will engage rod 134 and force it downwardly against one end of the return bent spring member 91 to cause contact 89 to engage fixed contact 87.

Referring now to Figs. 7 and 8 of the drawings, I have there illustrated a modified form of planar auxiliary heater 141 in which I use a relatively wide and relatively thin strip 143 of a suitable resistor material. This resistor strip is held at several places by cooperating bars 145 of electric-insulating material, which bars are secured against a support and reflector member 147 by small machine screws 149. The object of using relatively thin and relatively wide resistor material is to obtain a relatively large radiating surface as compared to an inherent thermal mass and electrical resistance thereof.

Reference to Fig. 6 of the drawings will show that when contacts 87 and 89 are in engagement, an electric circuit will be established from one side 150 of a supply circuit, through the solenoid 127, through the auxiliary heater 79 (or 141) through the return bent conductor 91, through contacts 89 and 87, through the main toast heating elements and through the other supply circuit conductor 151. It may be here pointed out that when an operator presses downwardly on knob 47, the main switch comprising contacts 87 and 89 will be closed a short time before knob 47 has been pressed downwardly as far as it will go, thereby causing energization of solenoid 127 with consequent sudden upward movement of armature core 129 whereby a release movement of the detent 61 will be effected. However, this has no lasting result since, as was just above stated, the carriers and associated parts are not yet in their lowermost positions. Immediately after having been quickly projected upwardly, as above described, the core 129 drops downwardly to substantially a position centrally of the solenoid 127 and as shown in Figs. 1 and 3 of the drawings. This permits of proper interlocking action of the detent portion 63 and the projection 55.

The energized auxiliary heater 79 radiates heat against one side of the bimetal bar 67 which is so designed and constructed that it will move in a counter-clockwise direction, as seen in Figs. 2 and 6 of the drawings, so that ultimately it will engage roller 125. It will be noted that a relatively large distance is normally provided between the movable end of bimetal bar 67 and the roller 125 so that a relatively long time must elapse before the thermally energized bimetal bar 67 will engage roller 125.

Since coil spring 115 biases arm 103 in a clockwise direction (as seen in Fig. 2) it is obvious that no movement of arm 103 will result immediately after engagement of bimetal bar 67 therewith. It is necessary that the bimetal bar 67 be subject to a further increase of temperature whereby pressure will be exerted by the bimetal bar 67 against roller 125, this pressure of course increasing with increase of temperature, until at a given temperature the lateral pressure exerted by bimetal bar 67 will be sufficient to cause movement of arm 103 and therefore a movement of arm 101 in a direction to cause contact bridging member 99 to engage contact members 95 and 97. The temperature of the bimetal bar at which such action is effected is constant for any given setting of the spring 115.

When this occurs the auxiliary heater 79 of Fig. 6 will be short-circuited and will quickly cease to radiate heat against bimetal bar 67. Since solenoid 127 is short-circuited at the same time as is heater 79, the core 129 will drop to the bottom of tube 131. It is highly desirable, in a device of this kind, that the thermal mass of the heater be relatively small so that the heater will radiate heat in a very short interval of time after having been energized and will cease to radiate heat very quickly after having been deenergized.

When the bimetal bar 67 no longer receives heat from the auxiliary heater 79 it will, of course, cool and will tend to move in a clockwise direction, being initially aided in this movement by the biasing pressure of spring 115 against arm 103. The cooling bimetal bar will therefore move slowly in a clockwise direction until the spring 115 causes sufficient turning movement of arm 103 in a clockwise direction, as seen in Fig. 6, to cause movement of arm 101 in a direction to reenergize solenoid 127 and, of course, also auxiliary heater 79. However, the energized solenoid 127 causes quick upward movement of armature core 129, and a momentary impact thereof with striker block 65 to cause a releasing movement of the member 63 on detent 61, and a consequent upward movement of the bread carriers and the parts directly connected therewith. The detent is thus not held in releasing position since there is only a momentary engagement between this core 129 and the detent, the core returning to a position substantially within the solenoid. Upward movement of projection 139 will carry it out of compressing engagement with member 134 so that spring 137 will be active to force rod 134 upwardly and the resilient member 91 will move its contact 89 to the open position as shown particularly in Fig. 5 of the drawings. This action deenergizes the electric circuits of the toaster. Since this releasing action is effected very quickly when once initiated, the momentary reenergization of the auxiliary heater will not have any deleterious effects on the timing device or on the toaster.

It is of course obvious that it is necessary to so design, position and adjust the timing device that an automatic toaster controlled thereby will make substantially uniform toast irrespective of the length of time intervals between successive toasting operations. It must also adjust itself to the temperature rise of the toaster when a number of slices of bread are successively toasted with but short time intervals between the successive toasting operations. It must also take care of variations of the voltage of the supply circuit.

It is therefore obvious that the thermal timing structure embodying a single thermostatic element must be so designed, constructed, positioned and adjusted that the sum of the time intervals of its heat-up and of its cool-off periods will be substantially equal to the time interval required by the toast heating elements to properly toast or brown a slice or slices of bread to the desired degree, irrespective of the temperature of the toasting chamber and of the toaster structure.

The duration of the first toasting operation, starting with the toaster at room temperature, will be greater than the duration of quickly succeeding toasting operations, when the same degree of toasting or browning is desired. I have found that the duration of the heat-up portion of the cycle is shortened with increase of temperature of the toaster, while the duration of the cool-off portion of the cycle remains substantially constant, so long as a given setting of adjusting knob 121 is maintained.

An important element in obtaining this substantially constant duration of the cool-off portion of the cycle is the provision for subjecting the thermal timing means to a through draft of cooling air, the amount of which increases with increase of toaster temperature. I provide the bottom casing portion 75 with a plurality of slots 153 in the bottom face thereof and may, if desirable or necessary, provide similar slots in the sides or vertically extending portions thereof. The upper casing portion 73 may have a slot 155 at the front part thereof and a slot 157 at the rear thereof, which slot 157 registers with a slot 159 in the front intermediate wall 31. If a crumb tray (not shown) is used, it will also be provided with ventilated openings therein located in juxtaposition to the openings 153. I may further provide a top or upper opening 161 in front intermediate wall 31 so that a cooling draft may enter through the openings 153, one part of this cooling draft flowing through opening 155 upwardly in the chamber between the front wall of the casing and the front intermediate wall 31 and out through opening 161 therein. Another portion of the cooling draft may enter through the openings 153 and flow upwardly and outwardly through openings 157 and 159 where it will be powerfully affected by the main draft flowing through the toasting chamber, suitable openings being provided in plate 15 and in top frames 29 to permit of such a through draft of cooling air when the toaster is energized and operating. The result of such arrangement and operation is that the thermal timer cools to substantially the same degree as does the toaster in the entire time interval between two successive toasting operations so that the thermal timer will be effective to properly time successive toasting operations to produce uniformly toasted slices of bread irrespective of the time interval between successive toasting operations and irrespective of variations in operating conditions.

I have found it possible to dispense with the use of any compensating element of any kind and, in my opinion, the use of a relatively wide bimetal element having a large heat-radiating surface, located in a cooling draft which is affected to some degree at least by and varies in accordance with the main draft, which main draft is of course dependent on the temperature of the toaster itself, which temperature increases with continuous use for at least the first four or five quickly succeeding operations, helps materially in obtaining such results.

The use of an auxiliary heating element of relatively small mass and of relatively large heat-radiating surface is also a factor in the ability of a thermal timer of this kind to closely follow toaster temperature conditions and to cause the toaster to provide substantially uniformly toasted slices of bread irrespective of variations in the toaster temperature, irrespective of the time intervals between successive toasting operations, and also irrespective of variations in energizing voltage.

Tests made on a thermal timing device of this kind have shown that it may be used to determine accurately the durations of successive toasting operations and that it will cause the toaster to uniformly toast successive slices of bread irrespective of changes in the operating conditions, as has been set forth hereinbefore.

I claim as my invention:

1. A thermal timing means for causing termination of a toasting operation of an intermittently operable automatic electric toaster including a toast heating means and means for initiating a toasting operation, said timing means including a thermally responsive element, an auxiliary electric heater therefor, a control switch for said auxiliary heater, spring means for normally adjustably biasing said switch to auxiliary-heater-energizing position with a predetermined pressure, said thermal element being effective on predetermined rise of temperature to engage said control switch and on appreciable further rise of temperature to cause said control switch to move to heater-deenergizing position to thereby cause cooling of said thermal element and means energized by said switch when the thermal element has cooled to a predetermined lower temperature for causing termination of a toasting operation.

2. A toasting operation terminating means for an automatic electric toaster adapted to be used in carrying out a plurality of successive operations and including a toasting heater and means for initiating a toasting operation, said terminating means comprising a bimetal bar, an auxiliary electric heater therefor, a control switch for the auxiliary heater adapted to short circuit the same, adjustable spring means for yieldingly holding said control switch in open position with predetermined pressure, said bimetal bar being effective when heated to a predetermined temperature to operatively engage said control switch and on appreciable further rise of temperature to move said switch to auxiliary-heater deenergizing position and to hold it in said last named position for a predetermined length of time and means energized by said control switch when moved into open position by said bimetal bar on cooling to a lower predetermined temperature for causing termination of a toasting operation.

3. A thermal timing means for causing termination of a toasting operation of an intermittently operable automatic electric toaster including a toast heating means, a bread carrier movable into toasting and non-toasting positions relatively to the toast heating means and yieldingly biased to non-toasting position, a detent for holding the carrier in toasting position and means for moving the carrier in detent-engaging position, said timing means comprising a bimetal bar, an auxiliary electric heater therefor, an electro-magnetic release means including a coil connected in series circuit relation with said auxiliary electric heater and a movable core engaging said detent by impact only, a switch for controlling the energization of said coil and said auxiliary heater, spring means normally yieldingly biasing said switch into heater-energizing position with an adjustable predetermined pressure to cause heating of the bimetal bar and movement thereof into engagement with said switch at a predetermined temperature and movement of the switch into coil and heater deenergizing position on appreciable further rise of temperature, the bimetal bar then cooling and causing spring-actuated movement of the switch into coil energizing position to cause the core to impact the detent and move it to releasing position and terminate a toasting operation.

4. A thermal timing and toasting operation terminating means for an intermittently operable automatic toaster comprising a toast heating means, a main control switch therefor yieldingly biased to open position, a detent for holding said switch closed and means for closing said switch and holding it closed by said detent to initiate a toasting operation, said timing and terminating means including a bimetal bar, an auxiliary electric heater therefor, an auxiliary control switch for said auxiliary heater, spring means yieldingly biasing said auxiliary heater control switch to heater-energizing position, with an adjustable predetermined pressure to cause the auxiliary heater to be energized simultaneously with the toast heating means, said bimetal bar operatively engaging said switch on predetermined rise of temperature and then moving it to auxiliary-heater deenergizing position on appreciable further rise of temperature, the bimetal bar then cooling and causing return movement of said switch to its original position and electromagnetic means energized by said switch on return to its original position for acting on said detent to cause release thereof and termination of a toasting operation.

5. A device as set forth in claim 4 and including a single member supporting said bimetal bar, auxiliary electric heater, main and auxiliary control switch and said electromagnetic detent release means and a casing enclosing said bimetal bar, auxiliary electric heater and said main and auxiliary control switches, said casing having ventilating openings therein to cause passage therethrough of a draft of cooling air caused by the main heating means.

6. A thermal timing and toasting operation terminating means for an intermittently operable automatic toaster comprising a toast heating means, a bread carrier vertically movable into toasting and non-toasting positions relatively to said toast heating means and normally yieldingly biased into non-toasting position, a detent for holding said bread carrier in toasting position and means for moving said bread carrier into toasting position and into operative holding relation with the detent to initiate a toasting operation, said timing and terminating means including a bimetal bar, an auxiliary electric heater therefor, means effecting energization of said auxiliary heater when the bread carrier is moved into engagement with said detent, an electromagnet having a coil electrically connected in series circuit with said auxiliary heater and energized simultaneously therewith, a vertically movable magnet core in said electromagnet movable upwardly into impacting engagement with the detent on energization of the auxiliary heater and electromagnet and then into floating position in the electromagnet, a control switch for the auxiliary heater, spring means for normally yieldingly biasing said auxiliary heater control switch into heater-energizing position with an adjustable pressure, the bimetal being heated by the auxiliary heater to a predetermined temperature to operatively engage the heater control switch and then being further appreciably heated to overcome the bias of the spring means and cause movement of the switch to coil and heater deenergizing position with resultant downward movement of the magnet core to a position below the midpoint of the magnet coil, the bimetal bar then cooling and causing movement of the switch into magnet coil energizing position when cooled to a lower predetermined temperature to cause the magnet coil to move the core upwardly into impacting engagement with the detent to cause release movement thereof and termination of the toasting operation.

7. A device as set forth in claim 2 in which said auxiliary electric heater is of open planar shape, of low heat storage capacity and is spaced from said bimetal bar, and which device includes also a reflector at one side of said auxiliary electric heater to reflect heat from said auxiliary heater to said bimetal bar.

8. A device as set forth in claim 2 in which said auxiliary electric heater is of open planar shape, of low heat storage capacity and is spaced from said bimetal bar, and which device includes also a reflector at one side of said auxiliary electric heater to reflect heat from said auxiliary heater to said bimetal bar, and a single member on which said bimetal bar, auxiliary electric heater control switch and electromagnetic means are mounted.

9. A device as set forth in claim 4 in which said auxiliary electric heater is of open planar shape, of low heat storage capacity and is spaced from said bimetal bar, and which device includes also a reflector at one side of said auxiliary electric heater to reflect heat from said auxiliary heater to said bimetal bar, and a ventilated casing enclosing said bimetal bar, auxiliary electric heater, reflector, control switches for the toast heating means and the auxiliary electric heater, the toast heating means being effective to cause a through draft of cooling air to flow through said casing.

10. A thermal timing means for causing termination of a toasting operation of an intermittently operable automatic electric toaster comprising a toast heater, a main control switch therefor biased to open position, a detent for holding the switch in closed position and means for causing closing of the switch and holding it closed by the detent said timing means comprising a bimetal bar, an auxiliary electric heater therefor, a snap-acting control switch for the auxiliary electric heater including two coaxially mounted toggle arms and an overcenter spring therebetween, spring means engaging one of said toggle arms for normally adjustably biasing said auxiliary heater switch into heater-energizing position with an adjustable pressure, said bimetal bar on being heated flexing and engaging said one toggle arm to move the auxiliary heater control switch into auxiliary-heater-deenergizing position and to hold it there until the temperature of the bimetal bar drops to a lower predetermined value and means including an electromagnet and an impact type of magnet core energized by the auxiliary heater control switch when moved out of its auxiliary heater deenergizing position to cause release movement of the detent, opening of the main control switch and termination of the toasting operation.

11. A device as set forth in claim 1 and including openings in said toaster to cause a through draft of cooling air to affect the thermally responsive element to cause the duration of the time interval of heating of the thermal element to its predetermined switch actuating temperature by the auxiliary electric heater plus the duration of the time interval of cooling of the thermal element to the predetermined lower operative temperature by the through draft of cooling air to substantially equal the time interval required by the toast heating means to brown or toast a slice of bread to the desired degree irrespective of the temperature condition of the toaster.

JOHN R. GOMERSALL.